US012201169B2

(12) United States Patent
Desmeules et al.

(10) Patent No.: US 12,201,169 B2
(45) Date of Patent: Jan. 21, 2025

(54) ELECTRICALLY HEATABLE OVERSOCK

(71) Applicant: Alain Desmeules, Montreal (CA)

(72) Inventors: Alain Desmeules, Montreal (CA); Julie Kassabian, Montreal (CA); Bastien Jourde, Montreal (CA)

(73) Assignee: Brooke Erin DeSantis, Montreal (CA)

( * ) Notice: Subject to any disclaimer, the term of this patent is extended or adjusted under 35 U.S.C. 154(b) by 734 days.

(21) Appl. No.: 17/220,988

(22) Filed: Apr. 2, 2021

(65) Prior Publication Data

US 2022/0312863 A1 Oct. 6, 2022

(51) Int. Cl.
*A41D 13/005* (2006.01)
*A41B 11/00* (2006.01)
*H05B 3/34* (2006.01)

(52) U.S. Cl.
CPC .......... *A41D 13/0051* (2013.01); *A41B 11/00* (2013.01); *H05B 3/342* (2013.01); *H05B 2203/036* (2013.01)

(58) Field of Classification Search
CPC .... A41D 1/005; A41D 13/0051; A41B 11/00; H05B 3/342; H05B 2203/036; H05B 2203/014
See application file for complete search history.

(56) References Cited

U.S. PATENT DOCUMENTS 3,396,264 A 8/1968 Murphy
4,705,936 A 11/1987 Traffanstedt
5,640,714 A * 6/1997 Tanaka .................. A41B 11/00 2/22
6,576,003 B2 6/2003 Kotack
8,973,162 B1 * 3/2015 Bretan ............... A63B 71/1225 2/22
10,285,850 B2 5/2019 Carlsson et al.
10,492,543 B2 12/2019 Parnell
D899,760 S 10/2020 Kujang (Continued)

FOREIGN PATENT DOCUMENTS

CN 106942795 A * 7/2017
WO WO-2024034663 A1 * 2/2024

*Primary Examiner* — Shawntina T Fuqua
(74) *Attorney, Agent, or Firm* — Guy J. Houle; HOULE PATENT AGENCY INC.

(57) ABSTRACT

An electrically heatable, above-the-calf, oversock is formed by interconnected fabric sections. The oversock defines a foot section and a leg section interconnected with one another. The foot section has a toe heating section secured thereto. The leg section is formed of interconnected pattern fabric panels secured together by thread seams. In one embodiment of the oversock, the pattern fabric panels include two elongated side fabric panels extending from a top end of the leg section to the foot section, a front panel and a rear panel. At least the lateral one of the two elongated side fabric panels is formed by two or more superimposed side panel pattern pieces interconnected to one another by stitch seams and defining there between a channel through which extends a power feed wire from a switch secured in a upper part of the channel and accessible from an outer surface of the lateral side panel. The feed wire extends to the toe heating section where it is secured to a toe heating wire. An oversock retainer is secured about a top end of the leg section for retention of the oversock above the calf of a wearer person's leg.

17 Claims, 8 Drawing Sheets

(56) References Cited

U.S. PATENT DOCUMENTS

| | | | | | |
|---|---|---|---|---|---|
| 10,829,870 | B2 | 11/2020 | Carlsson et al. | | |
| D904,004 | S | 12/2020 | Kujang | | |
| 2007/0278201 | A1 | 12/2007 | Jones | | |
| 2008/0047955 | A1 * | 2/2008 | Rock | H05B 3/342 | 219/545 |
| 2009/0223254 | A1 * | 9/2009 | Ishida | D04B 1/108 | 66/185 |
| 2012/0193342 | A1 * | 8/2012 | Macher | H05B 3/342 | 219/211 |
| 2012/0260402 | A1 * | 10/2012 | Scherrer | A41B 11/00 | 2/239 |
| 2014/0033567 | A1 * | 2/2014 | Heathcote | A43B 5/12 | 36/92 |
| 2016/0120691 | A1 * | 5/2016 | Kirwan | A61F 7/02 | 607/111 |
| 2019/0289922 | A1 * | 9/2019 | Mcfadyen | A41B 11/003 | |
| 2020/0268068 | A1 * | 8/2020 | Okada | A41D 13/08 | |
| 2023/0157383 | A1 * | 5/2023 | Self | H05B 3/342 | 219/211 |

* cited by examiner

ELECTRICALLY HEATABLE OVERSOCK

FIELD OF THE INVENTION

The present invention relates to electrically heatable socks and more particularly to a novel electrically heatable oversock for use over a foot sock on a user person's foot and wherein the oversock extends over the calf of the wearer person's leg where it is firmly retained.

BACKGROUND OF THE INVENTION

Electrically heatable socks are known in the art wherein a dc battery is supported in a pocket formed on the sock upper to supply power to a heating element retained in the foot portion of the sock. A switch is mounted on the upper portion of the sock leg section to switch the power to the heating element on/off. Reference is made to U.S. Pat. No. 10,285,850 and Patent Publications 2012/0193342 and 2007/0278201 as examples of these.

Known electrically heatable socks have experienced several disadvantages which need to be overcome to provide comfort to the user person's during cold climatic conditions, particularly due to its many intended uses in various sport activities, outdoor work environments or simply for a leisure outdoor excursion during cold days.

Some of the known electrically heatable socks are fabricated with materials that are bulky and do not retain its shape by its nature and thereby present problems by not being able to be slipped onto a person's foot and leg. Also, it is important that the sock be firmly retained about a user person's leg due to the fact that the load of the battery causes the upper portion of the sock to slip down over the wearer person's leg. By constant slipping of the sock upper portion, the wire which connects the battery to the heating wiring and which runs down the sock upper portion becomes deformed and by repeated manipulations of the sock upper portion to reposition it to a comfortable position, strain and deformation is applied to the battery voltage feed wire and this often results in breakage of the voltage feed wire. Also, known electrically heatable socks are applied directly over the foot of a wearer person with the heating wire or element directly in contact with the wearer person's skin. This provides discomfort, particularly if the heating element is under the foot of the wearer person where the heating element is constantly pressed against the skin of the wearer person when in an upright position. Also, the heating element can cause skin burn and irritation, particularly if there is no control of the intensity of the heat source operating the heating element. This problem could be overcome by not applying the heated element or wire directly on the skin of the wearer person. There is therefore a need to provide a means to prevent the sock upper from slipping down and a further need to make it easy to position an electrically heatable sock over a wearer person's foot and leg with minimal manipulation of the sock by the person's hands not to cause damage to the dc battery supply wiring and the heating element and wherein the heating element is not in direct contact with the skin of the wearer person's foot.

Still further, dependent on external temperatures the heat generated by the heating element may be too high or too low and there is therefore a need to be able to adjust the heat for comfort under a variety of different cold weather conditions. Accordingly, the present invention proposes a control which can be incorporated in the sock upper leg portion at a position where it is readily accessible to the wearer person and wherein the control can provide for the adjustment of the heat intensity and provide an indication to the wearer person of the adjusted intensity. By adjusting the power intensity, the capacity of the supply voltage can be regulated. It would also be desirable to control the function of the battery by wireless remote control with an external wireless device such as an iphone, etc.

It is also important that the battery or batteries mounted on the sock upper leg section be supported at a proper position for load distribution on the leg of the wearer person not to provide discomfort and to permit ease of access and replacement of the battery. As mentioned above, because of the weight of the battery, it is also important to prevent the sock upper to slip down over the leg of the wearer person. Therefore, by firmly securing the upper end of the sock above the calf of the wearer person's leg, the sock would be prevented from slipping and the calf muscle would bear the load of the batteries and provide more comfort to the wearer person.

It would also be desirable to provide ease of connection and disconnection of the battery from the switch and to provide for the connection of the switch to larger battery packs which may be supported exteriorly of the heated sock on the wearer person's body.

SUMMARY OF THE INVENTION

It is therefore a feature of the present invention to overcome all of the above mentioned disadvantages of the prior art and to provide for an oversock which meets the above mentioned desirable needs.

A feature of the present invention is to provide an electrically heatable oversock which is comfortable when worn, easy to position over a user person's foot and leg, which is firmly retained over the leg above the calf and which does not slip down on the leg and does not cause any stress on the voltage feed wire leading to the heating element when the oversock is applied and remove from a wearer person's foot and leg.

Another feature of the present invention is to provide an electrically heatable oversock wherein a power control is integrated into the sock upper portion at a position readily accessible to the user person and wherein the switch of the power control is comprised of a single button with push-button functions to modify the intensity of the heat generated by the heating element (heating wire) and provide a display to the user person of the heat intensity selection.

Another feature of the present invention is to provide an electrically heatable oversock which is constructed of interconnected fabric panels with stitch seams located at predetermined locations and of a stitch form which provides comfort to the user person.

A further feature of the present invention is to provide an electrically heatable oversock which is worn over a sock positioned over a person's foot and wherein the oversock does not have a heel portion which would cause discomfort under the heel of the user person, prevents wear and tear if there was a heel part on the oversock which is an expensive sock, and reduces the amount of fabric material and thickness in the foot portion of the oversock making it more comfortable in tight shoes.

A still further feature of the present invention is to provide an electrically heatable oversock formed of interconnected pattern fabric panels and wherein elongated reinforced side panels form a channel in which the voltage feed wire is secured such as to prevent pulling forces to be applied to the dc battery voltage feed wire, and further wherein sock pulling bands are secured on opposed sides of the oversock at a top end thereof and in alignment with the reinforced side panels to facilitate donning the sock over a person's foot and leg and with reduced stretch on the sock material.

Accordingly, from a broad aspect, the present invention provides an electrically heatable, above-the-calf, oversock formed by interconnected fabric sections. The oversock comprises a foot section and a leg section interconnected with one another. The foot section has a toe heating section secured thereto. The leg section is formed of interconnected pattern fabric panels secured together by thread seams. The pattern fabric panels include two elongated side fabric panels extending from a top end of the leg section to the foot section, a front panel and a rear panel. At least one of the two elongated side fabric panels are formed by two or more superimposed side panel pattern pieces interconnected to one another by stitch seams and define there between a channel through which extends a power feed wire extending from a switch secured in a upper part of the channel. The switch is readily accessible from an outer surface of an outer one of the two or more superimposed pattern side panels. A voltage supply wire is securable to the switch. The power feed wire extends to the toe heating section where it is secured to a toe heating wire retained in a toe heating configuration. An oversock retainer is secured about a top end of the leg section for retention of the oversock above the calf of a wearer person's leg to prevent slipping down on a wearer's leg.

BRIEF DESCRIPTION OF THE DRAWINGS

A preferred embodiment of the present invention will now be described with reference to the accompanying drawings in which.

DESCRIPTION OF THE PREFERRED EMBODIMENT

Referring to all the drawings, and more particularly to FIG. 1-6, there is shown, generally at 10, the electrically heatable, above-the-calf, oversock of the present invention. Being an oversock, its function is to be positioned over a sock covering at least the foot of a wearer person where the heating element of the oversock is positioned. The oversock may be fabricated of various fabric materials whereby it is easily placed over the foot and leg of a wearer person while providing comfort to the user person. Also, sections of the oversock can be formed with different fabric materials, for example, the foot section 11 which contain the heated element may be formed of a thin flexible synthetic material, such as LYCRA, or other similar materials exhibiting stretch and strength, providing ease of application over the foot, while the leg section 12, which is not heated, may be formed of a MERINO wool fabric or other suitable fabrics which provides warmth. Accordingly, the oversock is not limited to precise fabric materials throughout its construction.

Figure 1:
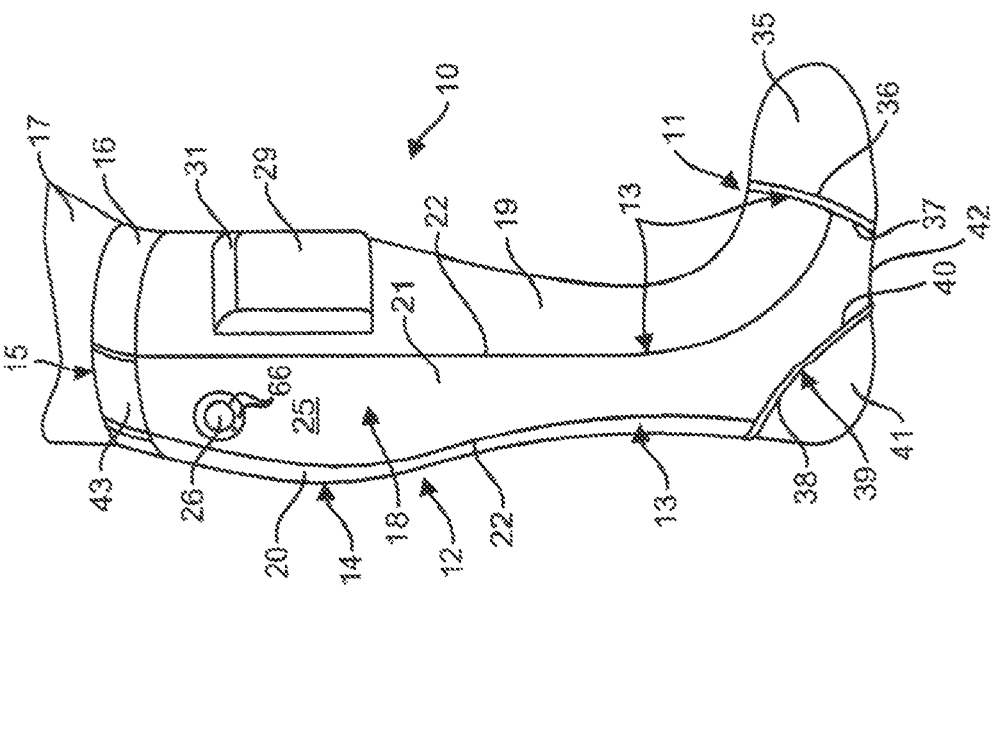
FIG. 1 is a side perspective view of the electrically heatable, above-the-calf, oversock of the present invention as shown secured about a wearer person's foot and leg with the top cuff portion of the oversock rigidly secured above the calf and below the knee of a wearer person.
Figure 6:
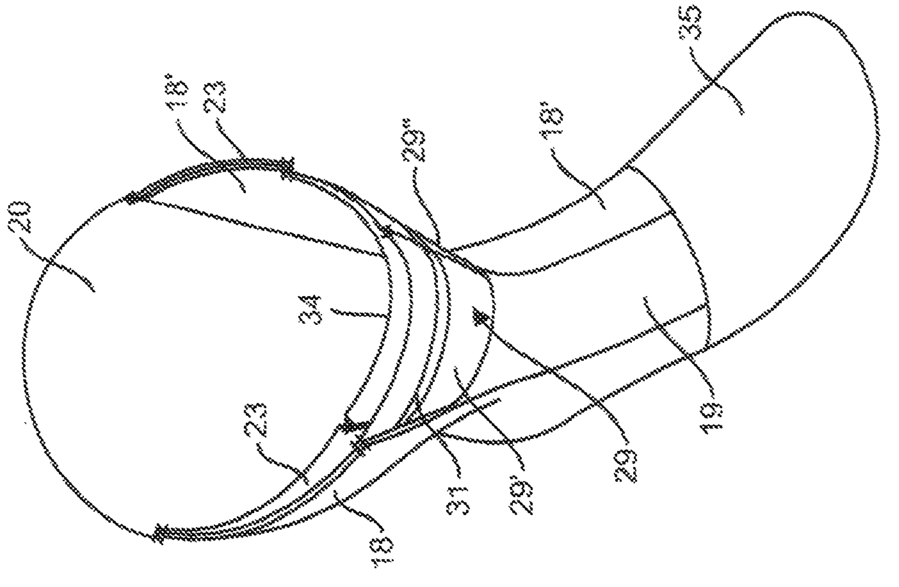
FIG. 6 is a top perspective view illustrating all of the pattern fabric pieces of an example of another embodiment of the oversock construction interconnected to one another by stitch seams.

With reference to FIGS. 1 and 6, the oversock construction is illustrated and has can be seen, it is formed by interconnected pattern fabric pieces and defines the foot section 11 and the leg section 12. These fabric pieces are interconnected together by stitch seams 13. The seams 13 are preferably, although not exclusively, flat stitch seams, such as flatlock seams, to provide comfort against the skin of the wearer person.

An important feature of the oversock 10 is that the leg section 12 extends over the calf 14 of the wearer person and is provided at its top end 15 with a retention hem 16 which constitutes a sock retainer to clamp against the leg over the calf 14 and below the knee 17 of the wearer person. The retention hem 16 is in the form of an elastic band sewn in the top circumference of the leg section 12 and concealed by a turn-over flap. On the other hand, the retention hem may be formed by incorporating VELCRO bands which interlock about the leg or by rubber threads knitted in a hem band. Other forms of clamping bands structures which are obvious to a person skilled in the art are intended to be covered by the present invention. The location of the retention hem, being above the calf and below the knee, provides for the calf muscle to support the load of the batteries mounted on the oversock. Also, the location is a cavitated location of the leg which prevents the hem attachment from slipping down.

Figure 5:
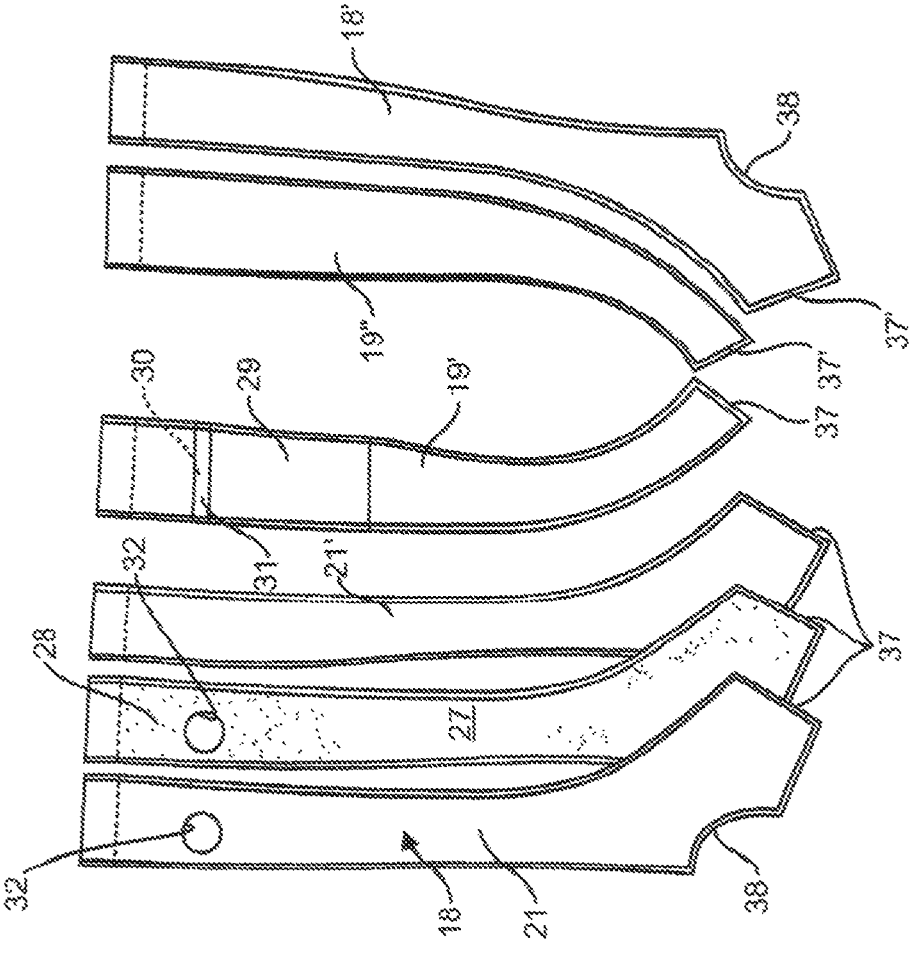
FIG. 5 is a plan view of the pattern fabric pieces forming the construction of the opposed side panels and the front panel of an embodiment of the oversock leg section.

As better seen from FIGS. 5 and 6, the oversock 10 is comprised of the following pattern fabric sections. In the example shown, the leg section 12 is formed of two elongated composite side fabric panels 18 and 18' extending from the top end 15 of the leg section 12 to the foot section 11, a front panel 19 and a rear panel 20. At least one of the two elongated side fabric panels 18 and 18', the lateral side panel illustrated in FIG. 6, is formed by two side panel pattern pieces 21 and 21' interconnected superimposed one on top of another in alignment by side stitch seams 22. The two side panel pattern pieces 21 and 21' define there between a channel 23 through which extends a power feed wire 55, as will be described later, and which extends from a switch circuit 24, see FIG. 15, secured in a upper part of the channel and having a push-button 26 accessible from an outer surface 25 of the outer fabric piece 21. As shown in FIG. 5 the lateral side panel 18 of the sock is formed with a third elongated side fabric pattern piece 27, herein referred to as a mid fabric piece having a wire concealing texture inner surface 28 to embed, or at least partly embed, the power feed wire therein not to be apparent from the outer surface 25 of the outer fabric piece 21 the wire is when secured in the channel 23. Because the lateral side panels 18 is formed of at least two fabric pattern pieces with stitch seams 22 extending all along their opposed side edges they provide a form of structural support feature to the oversock leg section on opposed sides thereof. The outer pattern panel piece 21 and the mid pattern panel piece 27 of the lateral side panel 18 are each provided with a hole 32 in an upper portion thereof and which align to one another to accommodate the mounting and securement of the push button switch 26 and associated circuit components.

Figure 4A:
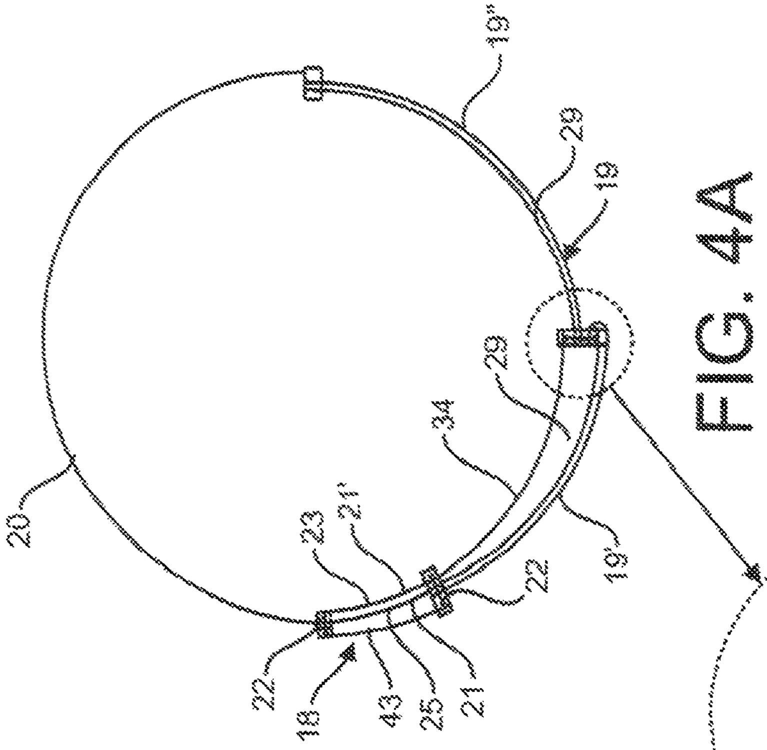
FIG. 4A is a cross-section view along cross-section lines A-A of FIG. 3 showing one example of the construction and interconnections of the pattern fabric pieces of the leg section.

As shown in FIGS. 4A and 5, the oversock 10 is shown in a simplified construction form with a single frontal panel 19 formed of two panel pattern pieces, 19' and 19", with the panel 19' closer to the lateral side panel 18 having a battery retention pocket 29 formed in an upper part thereof and with the pocket having a top opening 30 concealed under a flap 31 which prevents the battery from escaping the pocket. The side panel 18 is a narrow side panel formed by the two elongated side fabric pieces 20 and 21 defining the channel 23 there between. A single large rear panel 20 is interconnected between the side panel 18 and the second frontal panel pattern pieces 19", which is herein shown as also formed with a battery pocket 29.

Figure 4B:
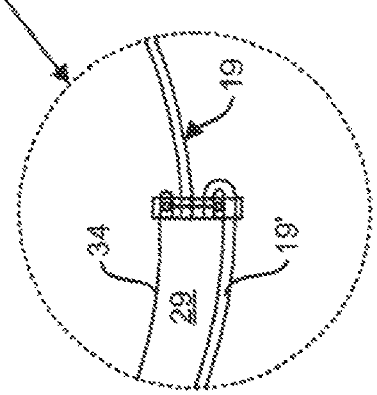
FIG. 4B is an enlarged view illustrating the seam construction of the reinforced lateral side panel which houses the switch and forms a channel for the power feed wire attachment.
Figure 3:
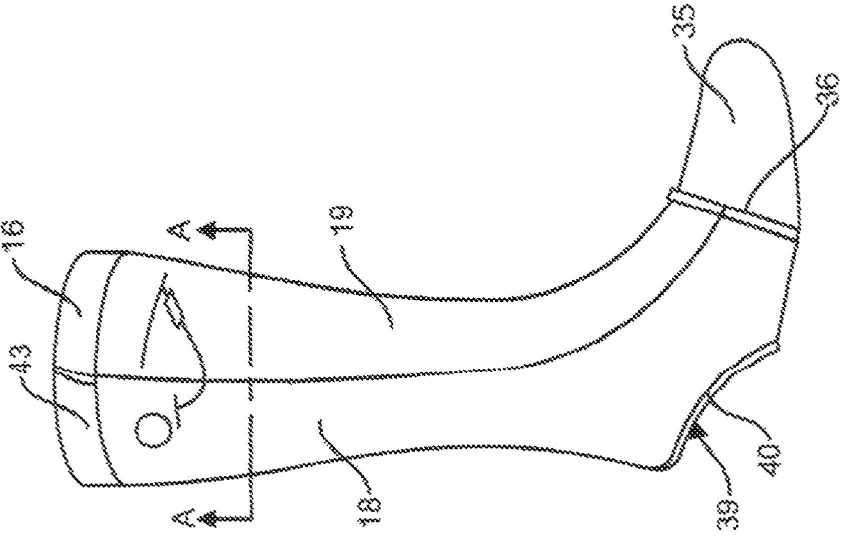
FIG. 3 is another side view of the oversock, similar to FIG. 1, and showing the battery voltage supply wire which exits the top of the channel for connection to the battery in the pouch of the oversock.
Figure 7:
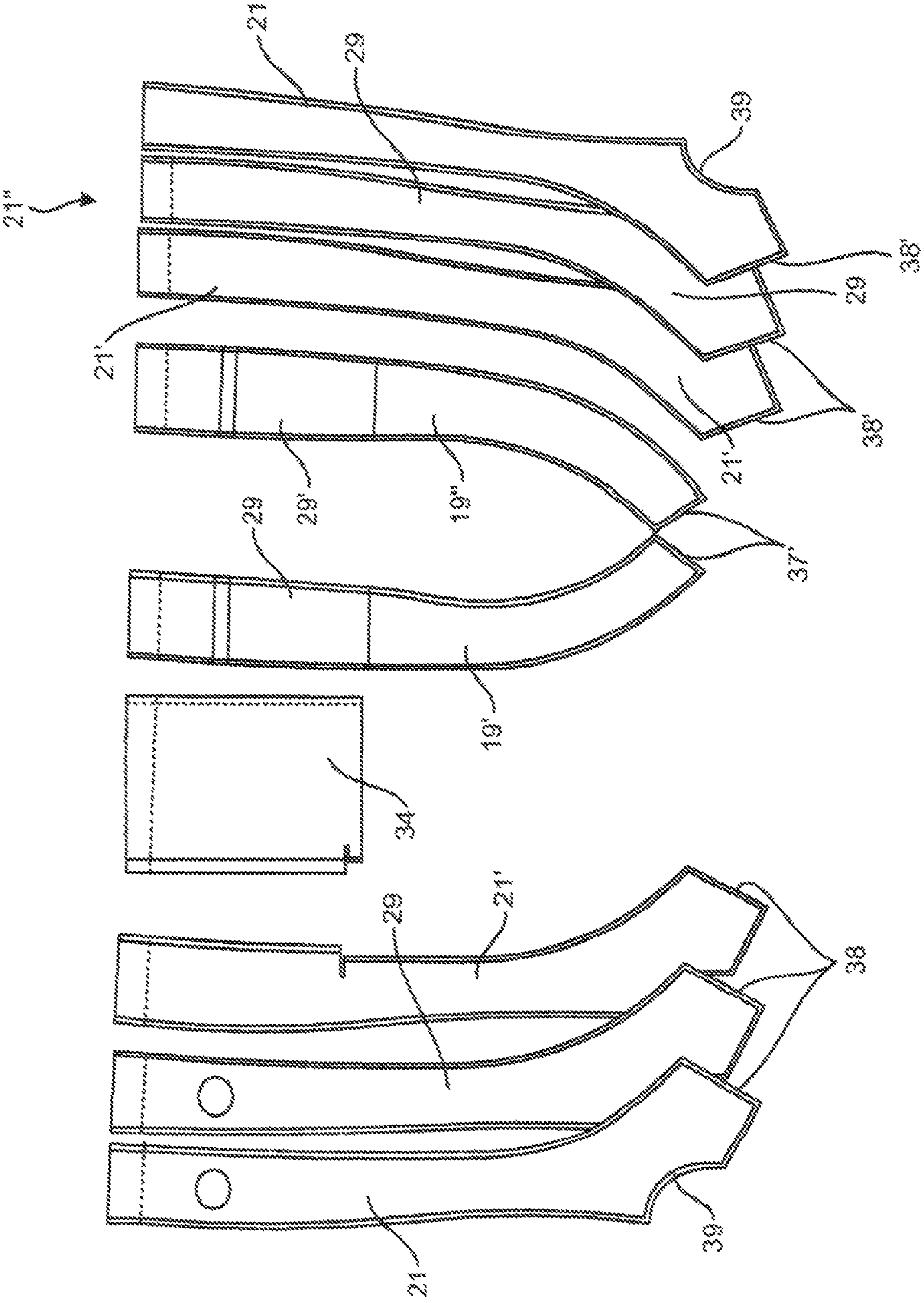
FIG. 7 is a plan view, similar to FIG. 5, of the pattern fabric pieces illustrating another example of the construction of the oversock leg section.
Figure 9:
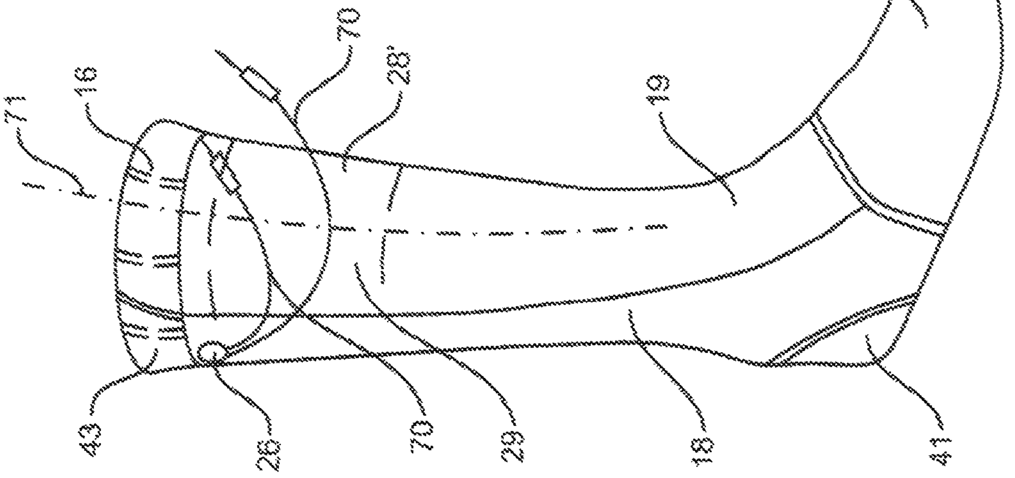
FIG. 9 is side perspective view further illustrating the position of the seams and the removable battery voltage supply wires secured to the switch and two battery pouches each disposed on a respective side of the longitudinal center vertical axis of the oversock to uniformly distribute the battery load on the upper part of the calf muscle of the wearer person.
Figure 8:
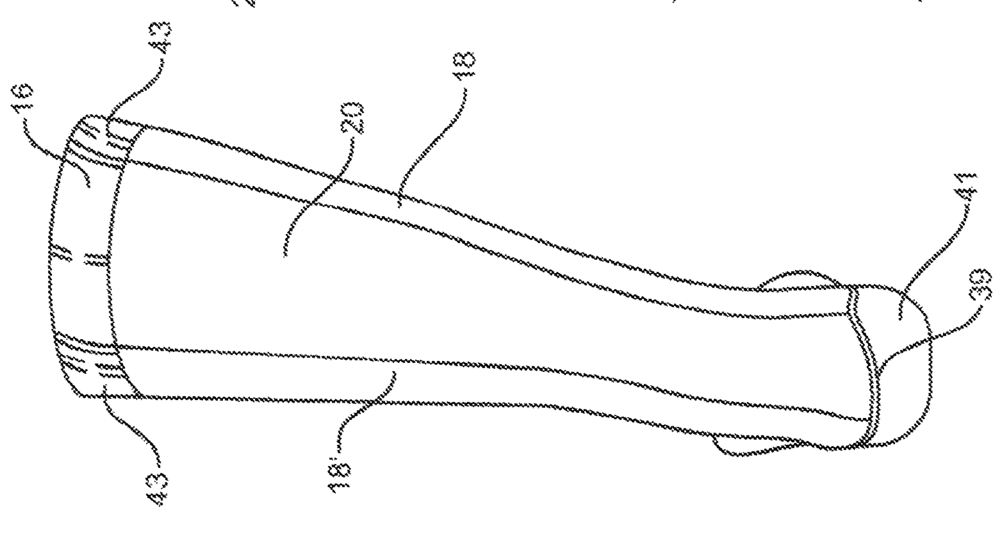
FIG. 8 is a rear view of the oversock showing the position of the longitudinal seams interconnecting the back panel to the opposed side panels.

FIGS. 6 and 9 show a further embodiment wherein the frontal panel 19 is formed with the two front panel sections 19 and 19' provided with a pocket 29 and 29', respectively, for the retention of two batteries on the oversock leg section upper portion. The pockets are disposed on opposed sides of the sock longitudinal center vertical axis 71 to distribute the weight of the battery load equally on both sides of the leg forwardly of the calf muscle 14, as shown in FIG. 1. As also shown in FIG. 6, the oversock pattern fabric pieces also comprise a toe heating section in the form of a heated toe cap 35 secured by a stitch seam 36 to the end edges 37 and 37' of the two frontal panel sections 19 and 19'. As shown in FIG. 7 the oversock may also be comprised of an additional medial side fabric panel 21" formed of three fabric pattern pieces 21, 21' and 29 to add structural rigidity and warmth to the oversock leg section. As shown in FIGS. 4A and 6, additionally, a top inner lining fabric piece 34 may be secured under the upper portion of the frontal panels 19' and 19", behind the pocket sections 29 and 29' to form the rear fabric wall of the pouches 29 and 29' where the batteries are housed. The lining fabric piece 34 may also be formed of a material to provide comfort against the wearer person's leg. FIG. 4B illustrates one form of reinforced stitching due to the weight of the batteries, but other suitable stitch forms, such as flatlock stitches, can used.

Figure 2:
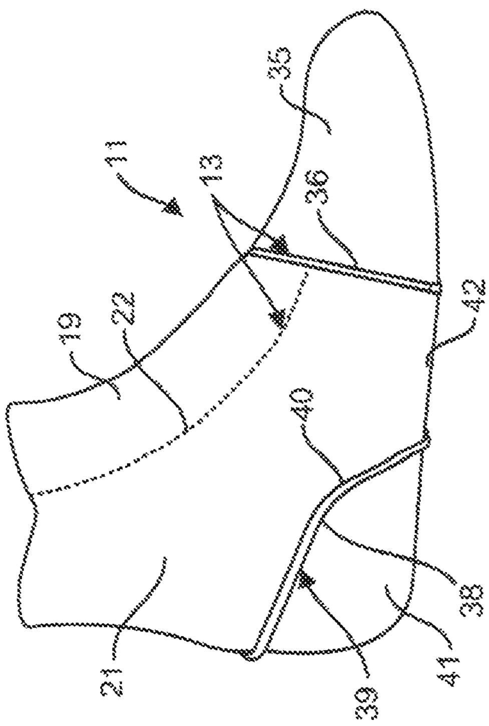
FIG. 2 is an enlarged side view of the construction of the foot section of the oversock showing the interconnecting seam locations of the pattern fabric part of the foot section and the location of the seams extending under the foot behind the ball of the foot and in front of the heel of a user person's foot.

Referring again to FIGS. 5 and 7, it can be seen that the side fabric pattern pieces of the side panels 18 and 18' are provided with a concave curvature 38 at a bottom rear end thereof where they form part of the foot section whereby to form a heel opening 39, as shown in FIGS. 1 and 2. The heel opening 39 has a hem 40 formed at its outer edge to prevent the material from unraveling and create an uncomfortable area of the foot section. Also, as better seen in FIG. 2, the heel opening 39 is shaped such as to have a forward lower edge 39' thereof disposed forwardly of the heel 41 of the wearer person, and projecting under the arch portion 42 of the foot where there is a cavity and much less pressure under the foot when resting on a ground surface. As mentioned above the hem 40 is formed, preferably but not exclusively, with flatlock stitches which are much less bulky and more comfortable when resting against the skin. The heel opening 39 provides several advantages and namely, by not having fabric material under the heel there is no wear and tear of the sock in this region which is more prone to wear, particularly seeing that the heatable oversock is expensive compared to ordinary socks. Also, by removing fabric material from the heel region reduces the thickness and bulk to make to sock more comfortable in shoes and particularly tight shoes.

Figure 13:
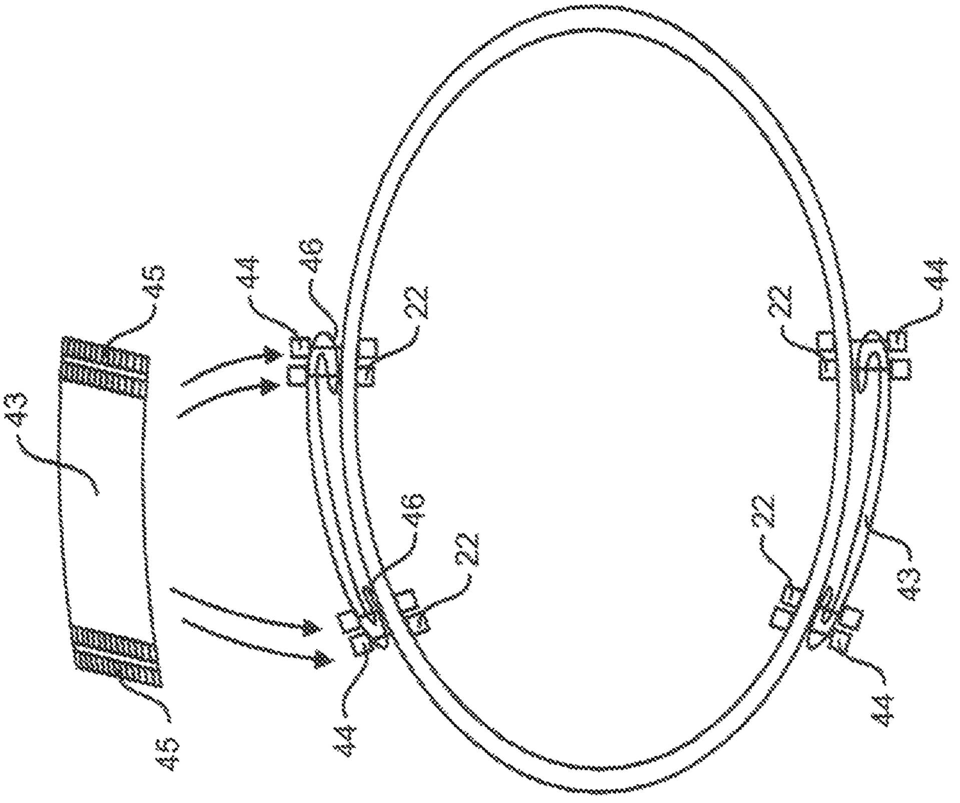
FIG. 13 is a top section view, partly in exploded form, showing the location of the sock pulling band and its connection location on opposed sides of the sock leg section.
Figure 12:
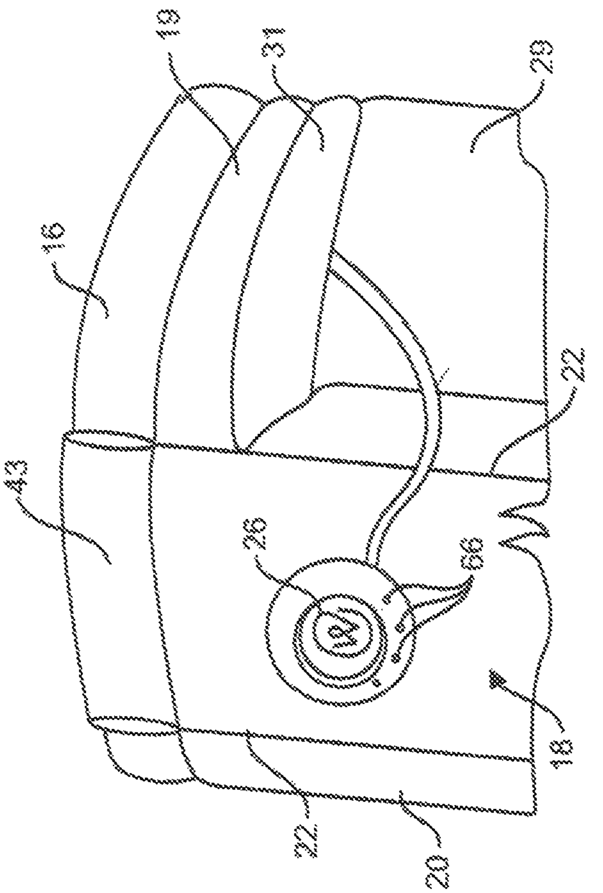
FIG. 12 is a fragmented side view of the top part of the oversock leg section showing the connection of a sock pulling band secured along the top elastic hem and aligned with the reinforcement of the side panels of the oversock.

As mentioned herein above, the side panels 18 and 18' with their overlaid interconnected pattern fabric pieces can be said to constitute elongated structural side panels which adds strength and stability to the oversock construction while the lateral panel providing a channel for lodging the voltage feed wire. As shown in FIGS. 12 and 13, a sock pulling band 43 is secured over the top retention hem 16 and secured thereto in alignment with the side seams of the elongated side panels 18 and 18' by bar tack stitches 44. To reinforce the stitch connection, the opposed end edges 45 of the sock pulling band are made with a folded band section 46. Therefore, when donning the oversock over the foot and leg of the wearer person, the oversock is pulled up over the leg by the bands 43 secured on opposed top side upper edges of the oversock with the pulling force transmitted down the side seams 22 of the side panels and thus distributing the pulling force along the seams and thereby resulting in a reduction of stretching force on the oversock fabric panels.

As mentioned above, the channel 23 formed in the lateral side panel 18 accommodates a voltage feed wire 55 to connect operating voltage from the switching circuit, to a heating element in the toe cap 35. With reference to FIGS. 11A to 11D it can be seen that the heating element is formed by a heating wire 50 secured in a specific configuration and extending over and under the toes of the wearer person in the area 47 of the toe cap, as shown in FIG. 11A. The toe cap 35 is constructed of fabric layers which encapsulates and secures the heating wire therein. For example, the toe cap fabrication as herein illustrated is comprised of a heating wire support fabric 51 on an outer surface of which is secured the toe heating wire 50. An outer fabric 52 encapsulates the heating wire 50. Because the oversock 10 is made to be positioned over an existing sock 49 on the foot of the wearer person there is thus sufficient fabric layers between the heating wire and the skin of the wearer person's foot not to burn the skin while the fabric heats up and distribute warmth. A thin inner liner fabric 52 may also be secured to the underside of the wire support fabric 51. The heating wire support fabric 51 herein shown, is a woven fabric containing carbon fiber threads. The fabric materials of the toe cap are preferably thin fabric materials, such as Nylon or Lycra or a combination thereof, which provide stretch and strength, or materials of substantially like properties. The leg section 12 of the oversock which is not heated is fabricated with fabric materials which are warmer, such as wool or other warm fabric materials.

Figure 11C:
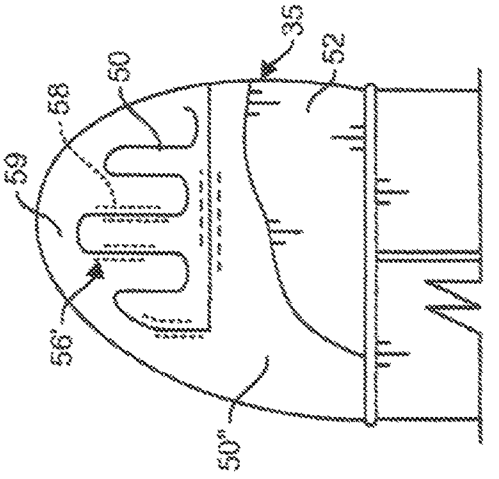
FIG. 11C is a fragmented bottom view of the toe cap illustrating the heating wire pattern secured in a like manner as that shown in FIG. 11B and showing the outer fabric material concealing the heating wire.
Figure 11D:
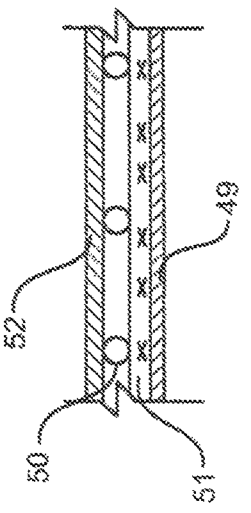
FIG. 11D is a cross-section view showing an example of the construction of the fabric layers of the toe cap in which the pattern heating wire is secured.
Figure 11B:
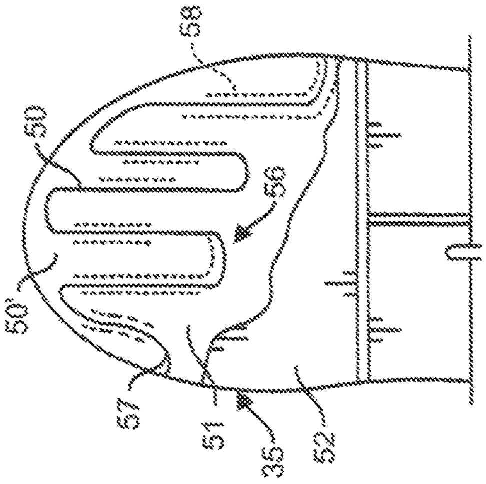
FIG. 11B is a fragmented top view of the toe cap illustrating the heating wire pattern secured to the top surface of the support inner fabric surrounding the toe cap and retained in an undulating configuration by stitch seams.
Figure 11A:
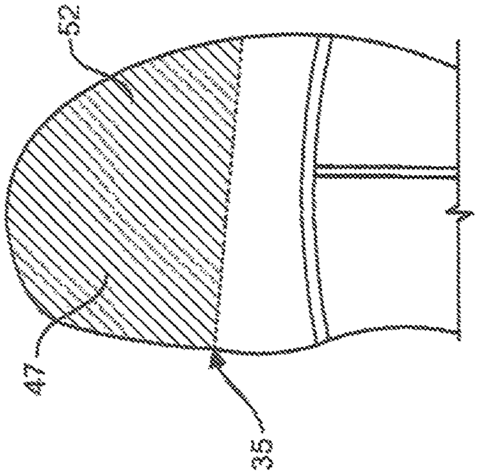
FIG. 11A is a top view of the heated toe cap section of the foot section of the oversock demarking the heated zone of the toe cap where the heated wire pattern is secured and further illustrating the seam location of the toe cap extending behind the ball of a wearer person's foot.

As shown in FIGS. 11B and 11C, the heating wire 55 is connected to the end of a voltage feed wire 55 on the top side of the toe cap 35 at a top side connection location 54 above and inwardly of the small toe, where there is a small depression, by a solder or pin/socket connection or other suitable connections, not shown but obvious to a person skilled in the art, which does not form a pressure point on the toes of the foot. As herein illustrated, the heating wire 50, on the top side 50' of the toe cap 35, is secured by stitches 53 formed on opposed sides of an undulating travel pattern 56 of the heating wire to provide adequate heat to the top side of the entire toes of the wearer person. The heating wire exits the top side 50' at a location 57, behind the big toe and forwardly of the metatarsolphalangeal toe bone where there is a depression, and wraps around to the underside 50", as shown in FIG. 11C, where it is further restrained by stitches 58 in a further undulating pattern 56' and thereafter is retained along an arcuate path 59 underneath the tip end of the toe cap 35 to terminate behind the small toe area.

Figure 10A:
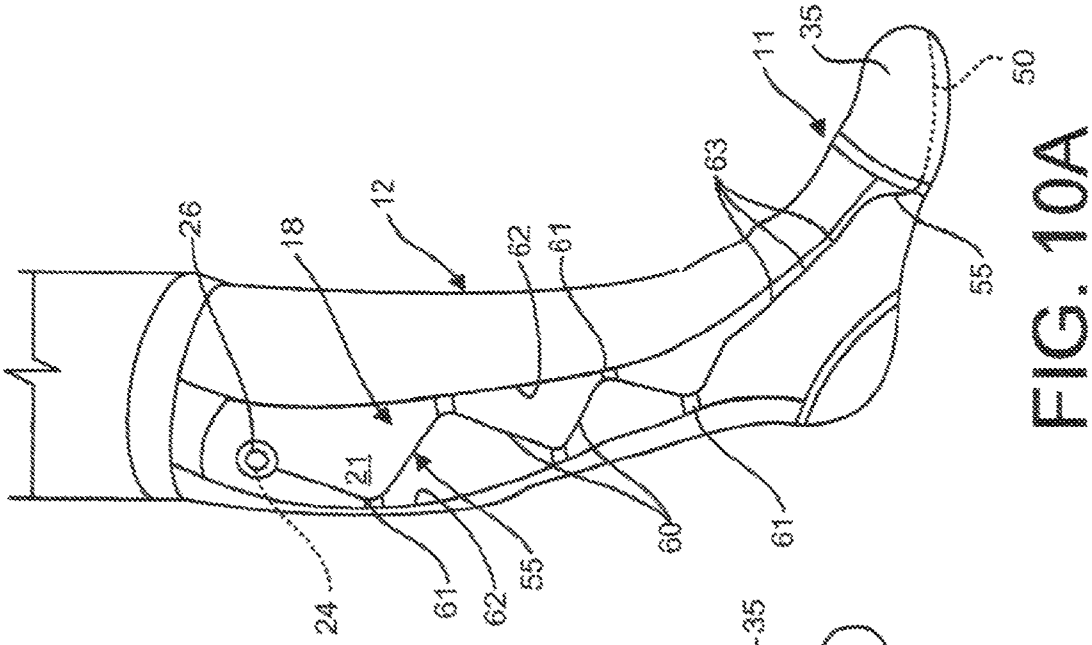
FIGS. 10A and 10B are side perspective views of the oversock illustrating the power feed wire retention connections disposed inside the channel formed by the lateral side panel and leading to the heated toe cap section where a heating wire pattern is secured.
Figure 10B:
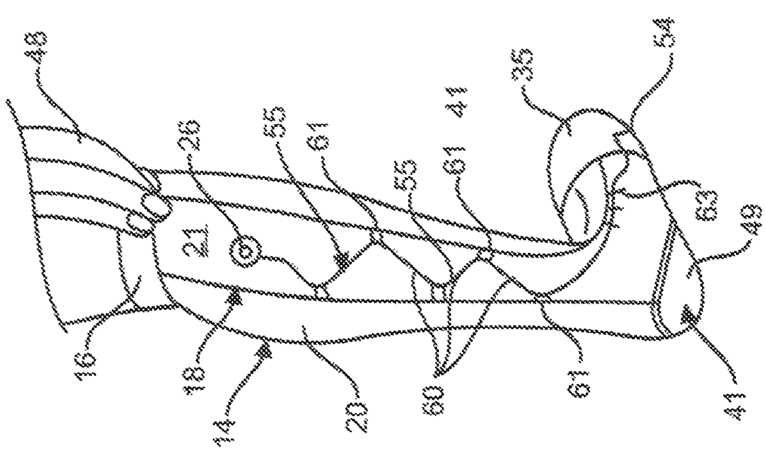

Referring to FIGS. 10A and 108 there is now described how the voltage feed wire 55 is retained within the channel 21 of the lateral side panel 18. As herein illustrated, the voltage feed wire 55 is connected at an upper end to a switch circuit 24 mounted behind the switch push button 26. The voltage feed wire 55 is retained along the leg section 12 in an undulating path laterally across the channel whereby the power feed wire is not subjected to a pulling force by deformation and stretching of the oversock material when the oversock is pulled over or removed from the foot and leg of the wearer person. As herein shown, the feed wire 55 is restrained in a zig-zag pattern 60 by loop stitches 61 secured spaced-apart along opposed inner longitudinal edges 62 of the channel leg section. The voltage feed wire 55 at a lower end of the leg section 12 is secured by further stitch points 63 to guide the wire over the top side of the foot section 11 in a restrained manner and to connect to the heating wire 50 at the connection location 54, above described. Accordingly, when the oversock is manipulated and pulled by a person's hand 48, as shown in Figure in FIG. 10B, when applied over the foot and leg of a wearer person, the voltage feed wire is not subjected to pulling forces which could eventually damage or disconnect the feed wire. When the fabric is stretched, the opposed longitudinal edges 62 where the feed wire 55 is connected in a zig-zag pattern, will simply be displaced and flex moving closer and further from one another and the feed wire will also move in an accordion fashion but not undergo any pulling force thereon.

Figure 14:
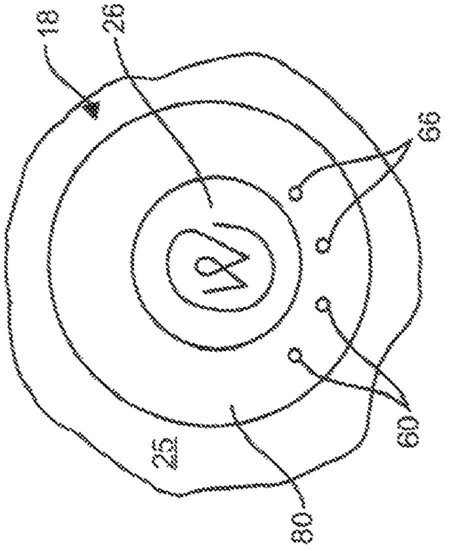
FIG. 14 is a front view of the push button switch.
Figure 15:
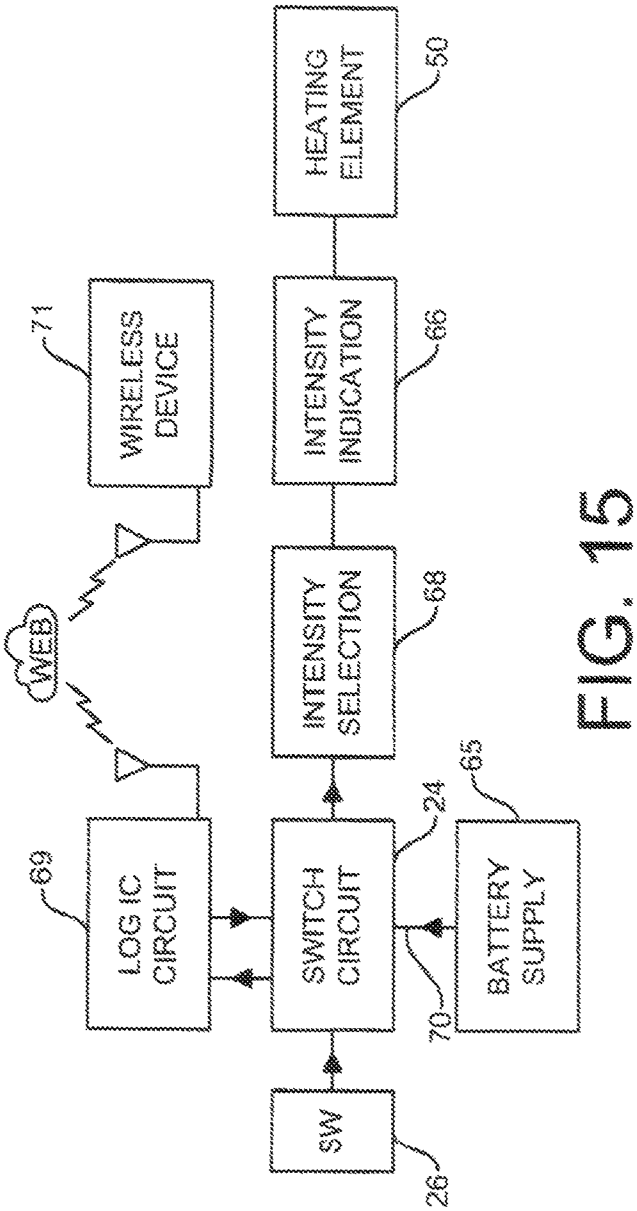
FIG. 15 is a simplified block diagram showing an example of the many functions of the push button switch and associated circuitry.

Referring to FIG. 15, there is illustrated, in block form, the configuration of the electronics associated with the switching circuit 24. As herein shown, the push-button 26, shown in FIG. 14, is associated with a multi-function switch circuit 24 and by depressing the switch button once the voltage feed wire is connected to the battery supply 65 to heat the toe cap. This causes a selection indicating signal, in the form of a light 66, mounted on a circumferential flange of the push button, to light indicating that maximum power is fed to the heating element. As shown, there is a plurality of different lights 66 mounted on the switch push button flange to indicate to the user person a switch selection made. The switching circuit 24 has a voltage intensity function circuits 68 which provides an indication of the switch position each time the button is depressed toggling the switch function. For example, depressing the switch button twice will cause the voltage intensity to drop to a lower level generating less heat at the toes of the wearer person. When the switch is toggled the indicator lights provide a signal to the wearer person of the selected heat intensity. The higher the intensity, the more drain on the battery and the shorter usable heating time. Also, the greater the number of batteries supported by the sock, the more power and the longer heating time. It is also foreseen that the voltage supply wire(s) 70 interconnecting the switch circuit 24 to the batteries 65, may be a much longer wire sufficient to extend along the upper leg of the wearer person to a battery support belt, not shown but well known in the art, provided with pouches to hold a plurality of batteries forming a large battery pack, and this would extend the operation time of the heating element for a much longer time period.

Another envisaged feature of the switching circuit 24 is its incorporation of a logic circuit that permits wireless communication via the web or WiFi, Bluetooth or other wireless communication protocols to a remote wireless device 71 such as an iPhone in possession by the user person. This is desirable when the user person does not have easy access to the switch button for adjusting the intensity of the heat generated at its toes, such as during sports activities, namely skiing, snowmobile excursions, snowshoeing, when heavy pants are used, or simply for a laborer person working outdoors in cold climatic conditions.

Many modifications and other embodiments of the present invention as described above will come to mind to a person skilled in the art to which the invention pertains having the benefit of the teachings described herein above and the drawings. Hence, it is to be understood that the embodiments of the present invention are not to be limited to the specific examples thereof as described herein and other embodiments are intended to be included within the scope of the present invention and the appended claims. Although the foregoing descriptions and associated drawings describe example embodiments in the context of certain examples of the elements and members and/or functions, it should be understood that different combinations of elements or substitutes and/or functions may be provided by different embodiments without departing from the scope of the present invention as defined by the appended claims. Furthermore, although specific terms are employed herein, they are used in a generic and descriptive sense only and other equivalent terms are contemplated herein with respect to the items that they relate to. It is therefore within the ambit of the resent invention to encompass all obvious modifications of the examples of the preferred embodiment described herein provide such modifications fall within the scope of the appended claims.

The invention claimed is:

1. An electrically heatable, above-the-calf, oversock formed by interconnected fabric sections, said oversock being adapted be worn over a sock covering the foot of a wearer person, said oversock comprising a foot section and a leg section interconnected with one another, said foot section having a toe heating section secured thereto, said leg section being formed of interconnected pattern fabric panels secured together by stich seams; said pattern fabric panels including two elongated side fabric panels extending from an oversock retainer band secured to a top end of said leg section and into said foot section, a front elongated fabric panel and a rear elongated fabric panel; at least one of said elongated side fabric panels being formed by two or more superimposed panel pattern pieces interconnected to one another by stitch seams extending all along opposed side edges thereof to provide structural rigidity to said leg section, said two or more superimposed panel pattern pieces defining there between an elongated channel through which extends a power feed wire extending from a switch secured in a upper part of said elongated channel and accessible from an outer surface of an outer one of said two or more of said superimposed pattern panels, said power feed wire extending to said toe heating section where it is secured to a toe heating wire retained in a toe heating configuration, said oversock retainer band being secured about a top end of said leg section for retention of the oversock above the calf of a wearer person's leg to prevent said leg section from slipping down on the wearer person's leg, and wherein a sock pulling band is secured over said oversock retainer band which is secured to a top end of said elongated side fabric panels to provide ease of pulling said oversock over a sock about a foot of said wearer person, said sock pulling band being secured at opposed ends by transverse stitch seams aligned with said opposed stitch seams extending along said opposed side edges of said two or more superimposed panel pattern pieces whereby a pulling force applied to said sock pulling band by said wearer erson is transmitted to said opposed stitch seams of said at least one elongated side fabric panels resulting in a reduction of stretching forces on said oversock fabric sections, said front fabric panel having a pocket section for housing a dc battery, and an opening in said pocket section for the passage of said voltage supply wire.

2. An electrically heatable, above-the-calf, oversock formed by interconnected fabric sections, said oversock comprising a foot section and a leg section interconnected with one another, said foot section having a toe cap heating section secured thereto to provide heat above and below the toes of a wearer person, said leg section being formed of interconnected pattern fabric panels secured together by stitch seams; said pattern fabric panels including two elongated side fabric panels extending from an oversock retainer band which is secured to a top end of said leg section to said foot section, a front elongated fabric panel and a rear elongated fabric panel; said at least one elongated side fabric panel being formed by two or more superimposed panel pattern pieces interconnected to one another along opposed vertical edges thereof by stitch seams extending all along opposed side edges thereof to provide structural rigidity to said leg section, said two or more superimposed panel pattern pieces defining there between an elongated vertical channel through which extends a power feed wire extending from a switch secured in a upper part of said channel and accessible from an outer surface of an outer one of said two or more of said superimposed pattern panels, said power feed wire extending to said toe cap heating section where it is secured to a toe heating wire retained in said toe ca where it is disposed in a toe heating configuration, an oversock retainer band secured about a top end of said leg section for retention of the oversock above the calf of a wearer person's leg to prevent slipping down on the wearer person's leg, and wherein said foot section has a heel opening wherein there is no oversock fabric material and seams directly under the heel of a wearer person's foot to prevent wear and tear of said oversock under the heel where it is more prone to wear and to provide comfort to the wearer person.

3. The electrically heatable, above-the-calf, oversock as claimed in claim 2 wherein there is further provided a sock pulling band secured over said oversock retainer band which is secured to a top end of said elongated side fabric panels to provide ease of pulling said oversock over a sock about a wearer person's foot and the leg of said wearer person, said sock pulling band being secured at opposed ends thereof by transverse stitch seams aligned with said opposed stitch seams extending along said opposed side edges of said two or more superimposed panel pattern pieces whereby a pulling force applied by said wearer person is transmitted to said opposed stitch seams of said at least one elongated side fabric panels resulting in a reduction of stretching forces on said oversock fabric sections.

4. The electrically heatable, above-the-calf, oversock as claimed in claim 1 wherein said oversock retainer band is an elastic band secured at a top end of said interconnected pattern fabric panels for clamping retention about the leg of said wearer person above the calf and below the knee of said wearer person.

5. The electrically heatable, above-the-calf, oversock as claimed in claim 3 wherein said oversock retainer band is constituted by one of an elastic band, a Velcro fastener band and rubber threads knitted in a hem band.

6. The electrically heatable, above-the-calf, oversock as claimed in claim 1 wherein said side panel on said lateral side and medial side of said oversock are each comprised by three of said superimposed pattern fabric pieces and namely an outer pattern fabric piece, a mid pattern fabric piece and an inner lining pattern fabric piece; said channel being defined between said outer and mid pattern fabric pieces of said lateral side panel, and a hole provided in an upper portion of said outer and mid pattern fabric pieces of said lateral side panel for maintaining a switch button there through to provide external access to said switch button by the wearer person.

7. The electrically heatable, above-the-calf, oversock as claimed in claim 6 wherein said mid pattern fabric piece of said lateral side panel has a wire concealing textured inner surface which embeds said power feed wire, or at least a portion thereof, whereby said power feed wire is not readily apparent from outside said outer pattern fabric piece.

8. The electrically heatable, above-the-calf, oversock as claimed in claim 7 wherein said frontal panel is provided by two elongated frontal fabric pieces, one secured to said lateral side panel and the other secured to the medial side panel, each said frontal fabric pieces including a battery retention pocket in an upper region thereof for receiving a do battery therein, said pockets each being adapted to receive a respective voltage supply wire connected to said switch, said voltage supply wire having a quick-connector plug secured at a free end thereof for removable connection to said batteries.

9. The electrically heatable, above-the-calf, oversock as claimed in claim 2 wherein there is further provided a sock pulling band secured over said oversock retainer band and transversely across a top end of said elongated side fabric panels by connecting stitches at opposed ends edges of said sock pulling band, said connecting stitches being aligned with said stitch seams at said opposed longitudinal outer side edges of said reinforced elongated side fabric panels whereby a pulling force applied by said wearer person is transmitted to said opposed stitch seams of said at least one elongated side fabric panels resulting in a reduction of stretching forces on said oversock fabric material when said oversock is pulled by said sock pulling band over a sock about a foot and the leg of said wearer person.

10. The electrically heatable, above-the-calf, oversock as claimed in claim 9 wherein said one of said elongated fabric side panel defining said channel is a lateral side panel and the other being disposed on the medial side, said side panels constituting reinforced leg section side panels.

11. The electrically heatable, above-the-calf, oversock as claimed in claim 1 wherein said power feed wire is retained along an undulating path in at least a portion of said channel whereby said power feed wire is not subjected to a pulling force by deformation and stretching of the oversock material when said oversock is pulled over or removed from the foot and leg of the wearer person.

12. The electrically heatable, above-the-calf, oversock as claimed in claim 11 wherein said power feed wire is restrained and guided along a substantially uniform path along an upper edge of a lower end of said channel which extends over said foot section in a restrained manner by tack stitches and further wherein said power feed wire is connected to a toe heating wire retained along an undulating pattern formed above and below said toe heating section to provide heat to the toes of the wearer person.

13. The electrically heatable, above-the-calf, oversock as claimed in claim 11 wherein said power feed wire is retained in an undulating zig-zag pattern by loop stitches secured spaced-apart along opposed inner longitudinal edges of said channel of said leg section and offset from one another.

14. The electrically heatable, above-the-calf, oversock as claimed in claim 12 wherein said toe cap is comprised of a heating wire support fabric on an outer surface of which is secured said toe heating wire, and an outer fabric encapsulating said heating wire and said support fabric.

15. The electrically heatable above-the-calf, overstock as claimed in claim 14, wherein said heating wire support fabric is a woven fabric containing carbon fiber threads, and a lining fabric secured under said heating wire support fabric, said toe cap being secured to a lower end of said lateral and medial side panels and said front panel by a stitch seam which extends over and under the foot of a wearer person rearwardly of the ball of a wearer person's foot and forwardly of the heel of said wearer person.

16. The electrically heatable, above-the-calf, oversock as claimed in claim 1 wherein said two elongated side fabric panels are secured along a rear longitudinal edge thereof by a stitch seam to a respective side of said rear panel, said two elongated side fabric panels being secured along a front longitudinal edge thereof by a stitch seam to a front panel longitudinal half section, said longitudinal half sections being interconnected to one another by a center elongated stitch seam to form a front leg panel, and further wherein one or both of said front panel half sections are provided with a pocket at an upper end region thereof for the retention of one or two batteries.

17. The electrically heatable, above-the-calf, oversock as claimed in claim 1 wherein said switch is a push-button, multi-function, switch comprised of an on/off function and two or more voltage intensity function constituted by the number of depressions of said switch, said switch incorporating a logic circuit for communication with external communication devices for the control of the functions of said switch, and visual function settings indication means associated with said push-button switch to display an actual set function of said switch.

* * * * *